United States Patent
Lim et al.

(10) Patent No.: US 7,812,115 B2
(45) Date of Patent: Oct. 12, 2010

(54) METHOD FOR PREPARING HIGH MOLECULE LATEX RESIN POWDER

(75) Inventors: Kyung-sik Lim, Uijeongbu-si (KR); Tae-gun Ahn, Seoul (KR); Sang-il Nam, Ulsan-si (KR); Keun-hoon Yoo, Yeosu-si (KR); Chan-hong Lee, Daejeon (KR)

(73) Assignee: LG Chem, Ltd. (KR)

( * ) Notice: Subject to any disclaimer, the term of this patent is extended or adjusted under 35 U.S.C. 154(b) by 135 days.

(21) Appl. No.: 11/549,234

(22) Filed: Oct. 13, 2006

(65) Prior Publication Data
US 2007/0100103 A1      May 3, 2007

(30) Foreign Application Priority Data
Oct. 13, 2005    (KR) ...................... 10-2005-0096556

(51) Int. Cl.
  *C08C 1/14*  (2006.01)
  *C08F 6/22*  (2006.01)
  *C08J 3/12*  (2006.01)
  *C08J 3/16*  (2006.01)

(52) U.S. Cl. .................. 528/487; 528/502 F; 528/936; 523/352

(58) Field of Classification Search ................ 526/335, 526/65; 422/132–136, 225, 234, 236; 516/53; 523/202, 335, 352–353; 525/262; 528/487, 528/502 F, 936; *C08J 3/12*
See application file for complete search history.

(56) References Cited

U.S. PATENT DOCUMENTS

| | | | | |
|---|---|---|---|---|
| 4,897,462 A | * | 1/1990 | Yusa et al. | 528/486 |
| 5,314,990 A | * | 5/1994 | Jansen et al. | 528/486 |
| 5,370,964 A | * | 12/1994 | Patel et al. | 430/137.14 |
| 5,514,772 A | * | 5/1996 | Suzuki et al. | 528/487 |
| 5,521,231 A | * | 5/1996 | Suzuki et al. | 523/352 |
| 2005/0101726 A1 | * | 5/2005 | Lee et al. | 524/800 |

FOREIGN PATENT DOCUMENTS

EP      0611788      8/1994

(Continued)

OTHER PUBLICATIONS

IUPAC Definition of coagulation.*

(Continued)

*Primary Examiner*—Milton I Cano
*Assistant Examiner*—Brieann R Fink
(74) *Attorney, Agent, or Firm*—Cantor Colburn LLP

(57) ABSTRACT

The present invention relates to a method for preparing a high molecular weight latex resin powder, and more precisely, a method for preparing a high molecular weight latex resin powder which comprises the steps of preparing a slurry by coagulating a high molecular weight latex; stabilizing the slurry; and aging the stabilized slurry, and is characterized by the direct addition of a colloidal modifier to the high molecular weight latex reactant during the preparation of the slurry. According to the present invention, the high molecular weight latex resin powder prepared by the method of the present invention has excellent particle size distribution, apparent specific gravity, caking property and thermo-stability, even with high solid content, compared with the conventional slow coagulation, and at the same time the method has an advantage of reducing energy costs and waste water generation.

7 Claims, 1 Drawing Sheet

FOREIGN PATENT DOCUMENTS

| | | | |
|---|---|---|---|
| EP | 0861867 | | 9/1998 |
| KR | 2003023389 A | * | 3/2003 |
| KR | 2004039935 A | * | 5/2004 |
| KR | 2004065433 A | * | 7/2004 |
| KR | 2005000149 A | * | 1/2005 |
| KR | 2007041304 A | * | 4/2007 |
| WO | 03/022891 | | 3/2003 |
| WO | WO 2007043816 A1 | * | 4/2007 |

OTHER PUBLICATIONS

Machine translated English Version of KR 2003-023389.*
Machine translated English Version of KR 2004-065433.*
Machine translated English Version of KR 2005-000149.*
Machine translated English Version of KR 2007-0041304.*
Machine translated English Version of KR 2004-0039935.*
ISR for WO 20070438136.*
European Search Report and Opinion-Application No. EP 06 79 9186 dated Dec. 2, 2009.

* cited by examiner

[Figure 1]
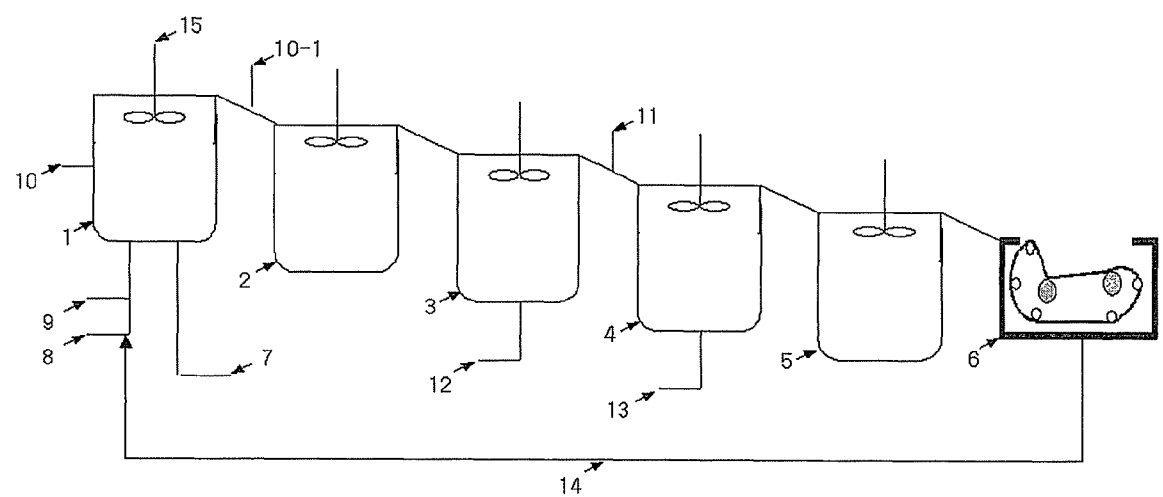

METHOD FOR PREPARING HIGH MOLECULE LATEX RESIN POWDER

This application claims the benefit of the filing date of Korean Patent Application No. 10-2005-0096556 filed on Oct. 13, 2005 in the Korean Intellectual Property Office, the disclosure of which is incorporated herein in its entirety by reference.

TECHNICAL FIELD

The present invention relates to a method for preparing a high molecular weight latex resin powder, and more precisely, a method for preparing a high molecular weight latex resin powder having an excellent caking property, thermo-stability, apparent specific gravity and particle size distribution even with a high solid content, compared with the conventional slow coagulation process, and at the same time be able to minimize energy costs and waste water.

BACKGROUND ART

The method to produce a high molecular weight latex resin powder from a high molecular weight latex prepared by the conventional emulsion polymerization is as follows: First, an aqueous solution of a coagulant such as an inorganic salt or acid is added to the high molecular weight latex, then the electrostatic stability of the high molecular weight latex is broken by an emulsifying agent, resulting in the coagulation of high molecular particles in the latex. The coagulated high molecular particles form a slurry and this phenomenon is called coagulation. The slurry formed by the coagulation is simply a kind of multi-particle assemblage which is not formed by a physical bond, so it is easily broken by any foreign shear. Therefore, aging is required to increase the strength of the slurry by the formation of a physical bond. This procedure progresses at high temperature and interpenetration between chains makes the slurry a particle with better strength.

However, the above conventional method requires an excessive amount of coagulant, which makes the coagulation process very fast, so that the coagulation of the particles will be chaotic. This suggests that the final particles will be irregular and the particle size distribution will be wide, leaving questions about the processing. For example, if a powder with a diameter of 450 µm is mass-produced, transportation and storage thereof will be difficult. If a powder with a diameter of less than 70 µm is mass-produced, dehydration and drying will be difficult and in particular scattering of the micro-powder during packing results in loss of the resin, difficulty in powder transportation from line to line, environmental pollution by dust generation and making the working conditions worse.

As an attempt to overcome the above problems, U.S. Pat. No. 4,897,462 introduces a slow coagulation method based on processing under the critical coagulation concentration. However, this method could not overcome the problem of high viscosity in the early stage, which is the typical problem of slow coagulation, so it can only be applied to batch coagulation and not to continuous coagulation. In addition, according to the slow coagulation process, the moisture content in a round-shaped powder is high, suggesting that dehydration is not satisfactory and a powder with an incomplete structure might be produced because of irregular melting of micro-powders by high temperature during aging. The apparent specific gravity of the powder might also be lowered.

According to EU Patent No. 0,611,788, a continuous coagulation process is applied to the slow coagulation. However, the solid content of the slurry is regulated to be low to overcome the problem of high viscosity in the early stage and to secure a regular particle size distribution. The low solid content in the slurry has an advantage of a regular particle size distribution but has the problems of high energy costs for production and a huge amount of waste water.

To overcome the above problems of the conventional methods, it is an object of the present invention to provide a method for preparing a high molecular weight latex resin powder having an excellent caking property, thermo-stability, apparent specific gravity and regular particle size distribution even with a high solid content, compared with the conventional slow coagulation process, and is able to minimize energy costs by circulation of the working solution and reduce waste water.

The above object and other objects of the present invention can be achieved by the following exemplary embodiments of the present invention.

DISCLOSURE OF THE INVENTION

To achieve the above objects, the present invention provides a method for preparing a high molecular weight latex resin powder, which contains the steps of preparing a slurry by coagulation of a high molecular weight latex; stabilizing the prepared slurry; and aging of the stabilized slurry. It is also characterized by the direct introduction of a colloidal modifier into the high molecular weight latex during the preparation of the slurry.

Hereinafter, the present invention is described in detail.

Coagulation using an excessive amount of coagulant is carried out rapidly because no energy barrier is built, but as a result the coagulation is irregular and thus the final particles have irregular shapes. On the contrary, slow coagulation is carried out within an energy barrier in the secondary well region, which means coagulation progresses very slowly and thus particles can be rearranged to produce regular round-shaped particles by regular charging.

The method for preparing the high molecular weight latex resin powder of the present invention is composed of the following steps:

(a) stabilizing a high molecular weight latex by adding an emulsifying agent;

(b) transferring the stabilized high molecular weight latex into a coagulation tank and preparing a slurry by coagulation with the addition of a colloidal modifier;

(c) stabilizing the slurry in a stabilization tank;

(d) aging the stabilized slurry in an aging tank;

(e) transferring the aged slurry into a dehydration tank and separating the working solution; and (f) transferring the separated working solution into the coagulation tank of (b).

The method of the present invention can additionally include the step of coagulating the slurry prepared in step (b) in another coagulation tank after step (b).

The method of the present invention can also include the additional step of coagulating the stabilized slurry of (c) in another coagulation tank after step (c).

After step (c), the method can additionally include the step of coagulating the stabilized slurry of (c) in another coagulation tank and then stabilizing the slurry again.

After step (d), the method can additionally include the step of secondary aging of the aged slurry of step (d).

FIG. 1 illustrates the method for preparing the high molecular weight latex resin powder based on slow coagulation, in which two coagulation tanks and two aging tanks are used. The second coagulation tank is installed in the latter part of the stabilization tank when multi tank continuous coagulation is carried out.

As shown in FIG. 1, which shows multi-tank continuous coagulation, an emulsifying agent is added to the high molecular weight latex to increase stability. The stabilized high molecular weight latex, the primary coagulant, and water are put into the primary coagulation tank (1) through the high molecular weight latex supply line (7), the primary coagulant supply line (8) and water supply line (9) respectively, and the primary colloidal modifier is continuously added to the reactant through the primary colloidal supply line (10), resulting in the formation of a slurry. The prepared slurry is transferred to the stabilization tank (2) by an overflow method where the structure of the slurry becomes more elaborate, and then the slurry is transferred to the secondary coagulation tank (3) by the overflow method again. To the slurry are added the secondary coagulant and the secondary colloidal modifier through the secondary coagulant supply line (12) and the secondary colloidal modifier supply line (11) respectively, followed by secondary coagulation. The resultant slurry is transferred to the primary aging tank (4) and the secondary aging tank (5) to harden the particles. The hardened slurry is transferred to the dehydration tank (6) where the working solution is separated. The separated working solution is re-circulated through the working solution supply line (14) and arrives at the primary coagulation tank to be used for the preparation of high molecular weight latex resin powder.

Hereinafter, the method of preparing the high molecular weight latex powder of the present invention is described step by step.

(a) The Step of Stabilizing High Molecular Weight Latex

An emulsifying agent is added to the polymerized high molecular weight latex for slow coagulation. The added emulsifying agent gives chemical stability to the latex, thereby slow coagulation can be safely induced.

The high molecular weight latex herein is a graft copolymer prepared by emulsion polymerization of a rubber polymer (50~90%) and a hard polymer (10~50%).

The rubber polymer is composed of a diene monomer such as butadiene, isoprene and chloroprene; and a C1~C4 alkyl acrylate (alkyl esters of acrylic acid) monomer such as butyl acrylate and octyl acrylate. The rubber polymer can contain such monomers independently or as a monomer mixture of at least two monomers.

The rubber polymer is a compound that can be co-polymerized with diene and alkyl acrylate (alkyl esters of acrylic acid) monomers, which can additionally contain an aromatic vinyl monomer such as styrene and α-methylstyrene; a C1~C4 alkyl methacrylate (alkyl esters of methacrylic acid) monomer such as methyl methacrylate and ethyl methacrylate; a C1~C8 alkyl acrylate (alkyl esters of acrylic acid) monomer such as methyl acrylate and ethyl acrylate; or a vinyl cyanide monomer such as acrylonitrile and methacrylonitrile. These monomers can be added independently or as a mixture of at least two monomers.

The hard polymer is comprised of a monomer able to form a branch of the graft-copolymer, which can be one or a mixture of at least two monomers selected from a group consisting of an aromatic vinyl monomer such as styrene and α-methylstyrene; a C1~C6 alkyl methacrylate (alkyl esters of methacrylic acid) monomer such as methyl methacrylate, ethyl methacrylate and butyl methacrylate; a C1-C6 alkyl acrylate (alkyl esters of acrylic acid) monomer such as methyl acrylate, ethyl acrylate and butyl acrylate; a vinyl cyanide monomer such as acrylonitrile and methacrylonitrile; and a vinyl halide monomer such as vinyl chloride and vinyl bromide.

The emulsifying agent plays a role in stabilizing the high molecular weight latex and is added to the latex before coagulation. The emulsifying agent is exemplified by sodium lauryl sulfate, sodium dioctylsulfosuccinate or alkyldiphenyloxide disulfonate.

The preferable content of the emulsifying agent in 100 weight part of the solid high molecular weight latex is 0.1~1 weight part.

It is preferred to add the emulsifying agent to the high molecular weight latex before coagulation. If the emulsifying agent is added to the coagulation tank during the coagulation, the apparent specific gravity of the powder will be slightly improved, compared with the case without addition of the emulsifying agent, but the caking property will deteriorate.

(b) Preparation of the Slurry

The high molecular weight latex stabilized in step (a) is transferred to the coagulation tank, to which a coagulant, water and a colloidal modifier are continuously added and coagulated to give a slurry.

The coagulation at this time can be carried out in two or more different coagulation tanks, which will be designated as 'the primary coagulation tank' and 'the secondary coagulation tank' and so forth.

The coagulant can be one or more compounds selected from a group consisting of soluble inorganic acids such as hydrochloric acid, sulfuric acid and phosphoric acid; and inorganic salts such as calcium chloride and magnesium sulfate.

The content of the coagulant can be regulated according to the critical coagulation concentration of the coagulant, considering the characteristics of the high molecular weight latex.

The high molecular weight latex, coagulant and water are provided to the lower part of the coagulation tank and will be transferred to the upper part of the stabilization tank or the upper part of the secondary coagulation tank by an overflow method. This lower part input/upper part output system prevents a short by-pass of the slurry, which means unexpected residence of the slurry in the coagulation tank is prevented and at the same time discharge is not too fast so that residence time is properly regulated.

The structures of the coagulation tank and the stirrer are as follows.

The H/D (height/diameter) ratio of the coagulation tank is 1.5~2.0, which is bigger than that of a conventional reactor. If a coagulation tank is this size, up/down mixing in the coagulation tank is prevented and the flow is consistent with the direction of the fluid flow, thereby securing an even residence time. Considering the H/D of the coagulation tank (1.5~2), the stirrer is designed as a three-fold stirrer, in which a 4-blade flat paddle is equipped to induce radial flow without a baffle to prevent up/down mixing in the coagulation tank. The ratio (d/D) of the diameter of the stirrer (d) to the diameter of the coagulation tank (D) is preferably 0.6~0.7. Considering the higher viscosity of the slurry in the coagulation tank than that of the conventional slurry, the general d/D (0.3~0.4) is not good for effective mixing. Also, the linear velocity of the stirrer is preferably 1.5~3.0 msec.

In this step, added to the coagulation tank are a high molecular weight latex having a size of 0.05~0.4 μm and inorganic salts or acids as a coagulant, followed by slow coagulation with a short pass with a small amount of coagulant. At this time, determination of the critical coagulation concentration is very important. The critical coagulation concentration indicates the amount of non-coagulated high molecular weight latex, which affects the outward appearance (appearing as a light ivory color like milk) and the particle size distribution of the slurry (a proper critical coagulation concentration makes an even, round particle size distribution in the slurry), and quantitatively it indicates 60~80% coagulation of the entire latex. If the coagulant content is smaller than the critical coagulation concentration, which means it is out of the slow coagulation range, the particles will not have a regular form. On the contrary, if the coagulant content is larger than the critical coagulation concentration, the particles will not have a regular shape and minute particles of less than 70 μm will be generated.

Slow coagulation is affected not only by the critical coagulation concentration but also by the coagulation temperature and the total solid content. If the coagulation temperature is higher than the provided standard, the diameter of the particles will increase in proportion to the coagulation temperature and lumping of particles will be significant. If the coagulation temperature is lower, the diameter of the particles will be smaller and the roundness and shape of the particles will be poor. Thus, the proper coagulation temperature and determination of the critical coagulation concentration by regulating the coagulant content are important factors for slow coagulation. In general, the proper coagulation temperature is determined by considering the rubber polymer and the hard polymer which form the high molecular weight latex and the graft rate. The higher the rubber polymer content, the lower the coagulation temperature goes. The higher the hard polymer content, the higher the coagulation temperature goes.

The characteristics of the coagulation depend on the total solid content. If the solid content is increased, the addition of a coagulant to induce slow coagulation will be limited and the lumping of slurries is significant, resulting in a wide particle size distribution. It is very difficult to raise the solid content to 10~13 weight % for slow coagulation and if is done, energy costs will be high and a huge amount of waste water would be a problem. In the lower part of the coagulation tank where the high molecular weight latex and the coagulant meet, viscosity is very low. The viscosity increases as it goes to the upper part where coagulation is carried out and there is some point in-between where viscosity is maintained without change. The reason for the wide particle size distribution is a rapid increase of viscosity. The increase of viscosity results in poor mixing and partial residence, causing lumping of slurry particles.

To solve the above problem, a colloidal modifier is directly introduced into the reactant in the high viscosity area of the coagulation tank to prevent lumping of slurry particles and thereby to give a high molecular resin with an even particle size distribution. The high viscosity area of the coagulation tank is not fixed and varies with the kind of high molecular weight latex and the coagulation conditions, so the location of the area has to be confirmed first.

The colloidal modifier can be one of silica ($SiO_2$), calcium carbonate ($CaCO_3$) and a hard inelastic copolymer having a glass transition temperature of at least 50° C.

The preferable size of the colloidal modifier particles is 10~100 nm. If the size of the particles is less than 10 nm, separation of rubber containing graft copolymer powder during preservation will be difficult. If the size of the particles is more than 100 nm, the surface area that can cover the entire rubber containing graft copolymer powder will be reduced, making the improvement of the powder characteristics difficult.

The preferable content of the colloidal modifier is 0.5~5 weight part for 100 weight part of the solid content of the high molecular weight latex.

For the efficient dispersion of the colloidal modifier, the content thereof is preferably 20% or less.

By adding the colloidal modifier into the region showing the highest viscosity, the solid content of the slurry can be raised to the level of 20 weight % during the slow coagulation and an even particle size distribution of the slurry particles can also be expected.

During the preparation of the slurry herein, two different coagulation tanks are used.

The second coagulation tank is indicated as 'the secondary coagulation tank', to which the secondary coagulant and the secondary colloidal modifier are added to complete the coagulation of the high molecular weight latex residue which remains uncoagulated in the stabilized slurry transferred from the primary coagulation tank.

The completely coagulated slurry in the secondary coagulation tank is then transferred to another stabilization tank, coagulation tank or aging tank by the overflow method. The temperature of the secondary coagulation tank depends on the latex, but generally is 5~10° C. higher than that of the primary coagulation tank. The preferable residence time in the secondary coagulation tank is 1~3 times longer than that in the primary coagulation tank. The addition of a coagulant into the secondary coagulation tank is preferably continued until there is no more non-coagulated high molecular weight latex left. To prevent a short by-pass by overflow, the stirrer is preferably equipped with a pitched paddle which favors up/down mixing.

To improve the caking property of the high molecular weight latex resin powder, a secondary colloidal modifier is preferably added to the coagulated slurry.

The secondary colloidal modifier can be the same compound as used for the primary colloidal modifier and the preferable content of the secondary colloidal modifier is 1~5 weight part for 100 weight part of the solid content of the high molecular weight latex resin.

It is preferred to add the secondary colloidal modifier directly to the chute which is placed between the secondary coagulation tank and the aging tank, or the aging tank.

When the coagulation is carried out in two different coagulation tanks, the secondary coagulation tank is preferably located in the rear of the primary coagulation tank or the rear of the stabilization tank.

When the coagulation is carried out in three different coagulation tanks, the conditions for the third coagulation are the same as those for the second coagulation. In this case, one or more stabilization tanks can be added among the coagulation tanks.

(c) Stabilization of the Slurry

The slurry prepared in step (b) is transferred to the stabilization tank to stabilize the slurry particles.

In this step, an appropriate stirring power that is able to prevent lumping of the slurry particles is required and so that the temperature therein is not raised. If the stirring power is too strong, the slurry particles will be brittle. If the temperature is raised, lumping will be observed due to the partial temperature increase.

In the stabilization tank, enough residence time must be allowed, which is 3~10 times longer than that in the primary coagulation tank.

After stabilization, the viscosity of the slurry particles is reduced and the slurry particles have a more elaborate structure.

(d) Aging of the Slurry

The slurry stabilized in step (c) is transferred to the aging tank, where the hardness of the slurry particles is increased.

Aging can be carried out in two or more aging tanks, which can be designated as 'the primary aging tank' and 'the secondary aging tank', etc.

The aging tank is equipped with a baffle to induce proper up/down mixing and the stirrer is preferably equipped with a pitched paddle.

After coagulation, if the pH of the stabilized slurry is decreased to 2, a base is added to adjust the pH level to 3~5 in order to improve thermo-stability.

The temperature of the aging tank depends on the composition of the high molecular weight latex, but generally a temperature around Tg is preferred.

When aging is carried out in two or more aging tanks, the secondary aging in the secondary aging tank plays a role in increasing the hardness of the slurry particles primarily aged in the primary aging tank at an acceptable temperature range so as not to cause lumping.

(e) Dehydration

The slurry aged in step (d) is transferred to the dehydration tank to separate the working solution from the slurry particles.

(f) Transmission of the Separated Working Solution to the Coagulation Tank

The isolated working solution of step (e) is re-circulated to the coagulation tank of step (b).

If the content of the ions in the working solution is more than the content of the ionic strength required for the coagulation of step (b), and the working solution is 100% circulated, slow coagulation will be unsatisfactory. Thus, the critical coagulation concentration has to be properly adjusted. When salt is used as a coagulant, the critical coagulation concentration can be adjusted by mixing some of the working solution and pure water to fit the ionic strength for coagulation. When an acid is used as a coagulant, the critical coagulation concentration can be adjusted by using a base.

Unlike the conventional commercial high molecular weight latex resin powder which has a wide diameter range of 40~800 μm, 90% of the high molecular weight latex resin powder of the present invention is 70~450 μm in diameter, indicating that the powder of the present invention has excellent particle size distribution, caking property and apparent specific gravity.

BRIEF DESCRIPTION OF THE DRAWINGS

The above objects, other features and advantages of the present invention will become more apparent by describing the preferred embodiment thereof with reference to the accompanying drawings, in which:

FIG. 1 is a schematic diagram showing a multi-tank continuous coagulation process utilizing two coagulation tanks and two aging tanks to recover a high molecular resin powder from a high molecular weight latex.

EXPLANATION OF REFERENCE NUMERALS
FOR DESIGNATING MAIN COMPONENTS IN
THE DRAWINGS

1: primary coagulation tank
2: stabilization tank
3: secondary coagulation tank

-continued

4: primary aging tank
5: secondary aging tank
6: dehydration tank
7: high molecular latex supply line
8: primary coagulant supply line
9: water supply line
10: primary colloidal modifier supply line
10-1: primary colloidal modifier supply line
11: secondary colloidal modifier supply line
12: secondary coagulant supply line
13: counteragent supply line
14: working solution supply line
15: stirrer

BEST MODE FOR CARRYING OUT THE INVENTION

Reference will now be made in detail to a preferred embodiment of the present invention, examples of which are illustrated in the accompanying drawings.

EXAMPLES

Example 1

Preparation of High Molecular Weight Latex Resin

To a 120 L high-pressure polymerization vessel equipped with a stirrer were added 180 weight part of ion exchange water, 0.5 weight part of buffer solution, 0.8 weight part of potassium oleate as an emulsifier, 0.065 weight part of sodium pyrophosphate, 0.0047 weight part of ethylenediamine tetrasodium acetate, and 0.003 weight part of ferrous sulfate, 0.02 weight part of sodium sulfoxylate formaldehyde and 0.11 weight part of diisopropylbenzene hydroperoxide as a polymerization initiator.

Then, 12 weight part of butadiene was added as a monomer together with 36 weight part of styrene and 2 weight part of divinylbenzene, which is a graft cross-linking agent, followed by reaction at 35° C. to give an inside layer latex.

To the prepared inside layer latex were added 50 weight part of butadiene as a monomer, 0.2 weight part of potassium oleate as an emulsifying agent, 0.02 weight part of sodium sulfoxylate formaldehyde and 0.11 weight part of diisopropylbenzene hydroperoxide as a polymerization initiator, followed by polymerization for 10 hours to prepare an outer layer latex with a mean diameter of 950 Å. To 88 weight part of the prepared rubber polymer solid content were added 100 weight part of water, 0.0047 weight part of ethylenediamine tetrasodium acetate, 0.003 weight part of ferrous sulfate, 0.02 weight part of sodium sulfoxylate formaldehyde and 0.13 weight part of potassium peroxide. Then 12 weight part of methyl methacrylate was added to the mixture. The mixture was heated at 80° C. for 30 minutes and polymerized for 60 minutes to give MBS graft-copolymer latex.

Preparation of High Molecular Weight Latex Resin Powder

A multi-tank continuous coagulation apparatus equipped with two coagulation tanks, two aging tanks and one stabilization tank in between the two coagulation tanks was used.

To the high molecular weight latex was added another high molecular weight latex containing 0.2 weight part of sodium lauryl sulfate at 10 L/hr to improve the stability of the latex. Then 10% diluted sulfuric acid coagulant (0.20 L/hr, 0.4 weight part for the high molecular weight latex) and water (15

L/hr, solid content: 20 weight part) were put into the lower part of the primary coagulation tank. A 10% diluted hard inelastic copolymer (0.50 L/hr, 1 weight part for the high molecular weight latex) was then supplied at 0.5H(H indicates the height of coagulation tank) away from the lower part of the primary coagulation tank. The residence time and the processing temperature in the primary coagulation tank were respectively 2 minutes and 33° C., and the reactant was transferred to the stabilization tank by the overflow method after coagulation. After 10 minutes of residence time in the stabilization tank, the slurry was transferred to the secondary coagulation tank by the overflow method. To the secondary coagulation tank was added sulfuric acid coagulant as a secondary coagulant (0.50 L/hr, 1.0 weight part for the high molecular weight latex resin). The residence time was regulated to be 6 minutes and the processing temperature was set at 38° C. To the secondarily coagulated slurry was added a 10% diluted hard inelastic copolymer at 1.00 L/hr before being transferred to the primary aging tank. The temperature of the primary aging tank was maintained at 50° C. and the pH therein was adjusted to be 3.5 by using 10% NaOH. The residence time was determined to be 30 minutes. The processing temperature in the secondary aging tank was maintained at 65° C. and a 30 minute residence time was given for full aging. As a result, the high molecular weight latex resin powder was obtained.

Example 2

The high molecular weight latex resin powder was prepared in the same manner as described in Example 1 except that the working solution from the dehydrator was modified as circular water in which the pH was regulated to be 7 by using NaOH and the circular water was added at 10 L/hr to water (15 L/hr, solid content: 20 weight part) for further use.

Comparative Example 1

The high molecular weight latex resin powder was prepared in the same manner as described in Example 1 except that the slurry stabilization process carried out in the stabilization tank was omitted.

Comparative Example 2

The high molecular weight latex resin powder was prepared in the same manner as described in Example 1 except that the primary colloidal modifier was not used and the slurry stabilization process carried out in the stabilization tank was omitted.

Comparative Example 3

The high molecular weight latex resin powder was prepared in the same manner as described in Example 1 except that the primary colloidal modifier was not used, the amount of water was adjusted to 23 L/hr (solid content: 15 weight part) to reduce the solid content in the slurry, and the slurry stabilization process carried out in the stabilization tank was omitted.

Comparative Example 4

The high molecular weight latex resin powder was prepared in the same manner as described in Example 1 except that the primary colloidal modifier was not used, the amount of water was adjusted to 28 L/hr (solid content: 13 weight part) to reduce the solid content in the slurry, and the slurry stabilization process carried out in the stabilization tank was omitted.

Comparative Example 5

The high molecular weight latex resin powder was prepared in the same manner as described in Example 1 except that the primary colloidal modifier was introduced at the location 0.2H from the bottom of the primary coagulation tank.

Comparative Example 6

The high molecular weight latex resin powder was prepared in the same manner as described in Example 1 except that the primary colloidal modifier was introduced at the location 0.8H from the bottom of the primary coagulation tank.

Comparative Example 7

The high molecular weight latex resin powder was prepared in the same manner as described in Example 1 except that the primary colloidal modifier was introduced at the chute (10-1) between the primary coagulation tank and the stabilization tank.

Comparative Example 8

The high molecular weight latex resin powder was prepared in the same manner as described in Example 1 except that the primary colloidal modifier was mixed with the high molecular weight latex before the addition.

Experimental Example

The high molecular weight latex resin powders prepared in the above examples and comparative examples were tested for particle size distribution and physical properties, and the results are shown in Table 1.
a) Particle size distribution—measured by using a standard sieve.
b) Apparent specific gravity—measured by ASTM D1985.
c) Caking test—20 g of dried powder was put in a cylindrical vessel prepared by the present inventors, which stood for 2 hours under a weight of 40 kg. Then, the resultant cake was put in a vibrator and the time of cake destruction due to the vibration was measured.

TABLE 1

| | | Example | | Comparative Example | | | | | | | |
|---|---|---|---|---|---|---|---|---|---|---|---|
| | | 1 | 2 | 1 | 2 | 3 | 4 | 5 | 6 | 7 | 8 |
| Solid content of slurry (%) | | 20 | 20 | 20 | 20 | 15 | 13 | 20 | 20 | 20 | 20 |
| Stabilization tank | o/x | o | o | x | x | x | x | o | o | o | o |
| Primary colloidal | Adding site | 0.5H | 0.5H | 0.5H | — | — | — | 0.2H | 0.8H | chute | Mixed with latex |

TABLE 1-continued

|  |  | Example | | Comparative Example | | | | | | | |
|---|---|---|---|---|---|---|---|---|---|---|---|
|  |  | 1 | 2 | 1 | 2 | 3 | 4 | 5 | 6 | 7 | 8 |
| modifier | Adding amount | 1 | 1 | 1 | — | — | — | 1 | 1 | 1 | 1 |
| Particle size | ≧450 μm | 4 | 4 | 7 | 20 | 12 | 6 | 4 | 9 | 2 | 12 |
| distribution | ≧300~<450 μm | 25 | 24 | 23 | 19 | 21 | 24 | 18 | 21 | 19 | 25 |
|  | ≧150~<300 μm | 45 | 44 | 41 | 22 | 35 | 44 | 43 | 44 | 39 | 37 |
|  | ≧70~<150 μm | 21 | 22 | 23 | 16 | 19 | 22 | 25 | 22 | 27 | 19 |
|  | <70 μm | 5 | 6 | 6 | 23 | 13 | 4 | 10 | 4 | 13 | 7 |
| Apparent specific gravity (g/ml) | | 0.53 | 0.53 | 0.50 | 0.52 | 0.48 | 0.45 | 0.52 | 0.53 | 0.51 | 0.52 |
| Caking test (sec) | | 32 | 35 | 103 | 137 | 135 | 120 | 68 | 54 | 70 | 65 |

As shown in Table 1, at least 90 weight % of the high molecular weight latex resin powders of Examples 1~2, prepared by the method of the present invention, were confirmed to be 70~450 μm in diameter, and they have high apparent specific gravity and an excellent caking property, suggesting that the transportation and packing of the powders is easy. In addition, those powder particles up to 70 μm in diameter were less than 5 weight % of the total powder, so scattering of minute powder particles included in the powder product, which commonly happens during extrusion, will be reduced and thereby the working environment for treating powders will also be enhanced. In particular, the powder of Example 2 which was prepared by re-cycling the working solution exhibited the same levels of particle size distribution and apparent specific gravity, and further total waste water was reduced.

In the meantime, the powder of Comparative Example 1, prepared without the slurry stabilization process in the stabilization tank, exhibited reduced apparent specific gravity and unsatisfactory particle size distribution. The powder of Comparative Example 2, prepared without the slurry stabilization process in the stabilization tank and the primary colloidal modifier, exhibited unsatisfactory particle size distribution, decreased apparent specific gravity, and deteriorated caking property. Those powders of Comparative Examples 3~4 prepared with reduced solid content, and those powders of Comparative Examples 5~8 prepared by adjusting the location for receiving colloidal modifier, exhibited unsatisfactory particle size distribution and reduced apparent specific gravity and caking property, compared with those powders of Examples 1~2.

INDUSTRIAL APPLICABILITY

As explained hereinbefore, the method of the present invention provides a high molecular weight latex resin powder having satisfactory particle size distribution and excellent apparent specific gravity and caking property, even with a high solid content, compared with the conventional slow coagulation process. According to the method of the present invention, slow coagulation can be carried out even with high solid content, suggesting that energy costs will be cut down and waste water will also be reduced owing to the re-cycling of the working solution. Therefore, the present invention provides a method for preparing a high molecular weight latex resin powder suitable for producing high-quality products and reducing production costs.

The invention claimed is:

1. A method for preparing a high molecular weight latex resin powder, the method comprising the steps of:
    (a) stabilizing a high molecular weight latex by adding an emulsifying agent;
    (b) transferring the stabilized high molecular weight latex into a primary coagulation tank, along with a coagulant and water, through underflow to prepare a slurry by coagulation, a colloidal modifier being added to a highest viscosity area of the coagulation tank;
    (c) transferring the slurry to a stabilization tank through overflow and stabilizing the slurry in the stabilization tank for a predetermined period of time while stirring the slurry, the stabilization tank being separated from the coagulation tank;
    (d) transferring the stabilized slurry to a secondary coagulation tank through overflow and coagulating the slurry in the secondary coagulation tank by adding a coagulant through underflow, a colloidal modifier being added to a highest viscosity area of the secondary coagulation tank;
    (e) transferring the coagulated slurry to an aging tank through overflow and aging the slurry in the aging tank;
    (f) transferring the aged slurry into a dehydration tank through overflow and separating a working solution; and
    (g) transferring the separated working solution into the primary coagulation tank of (b).

2. The method for preparing a high molecular weight latex resin powder according to claim 1, wherein the colloidal modifier is one or more compounds selected from a group consisting of silica, calcium carbonate and a hard inelastic copolymer having a glass transition temperature of at least 50° C.

3. The method for preparing a high molecular weight latex resin powder according to claim 1, wherein the content of the colloidal modifier is 0.5 to 5 weight part with respect to 100 weight part of a solid content of the high molecular weight latex resin.

4. The method for preparing a high molecular weight latex resin powder according to claim 1, after the step (b), further comprising: the step of further coagulating the slurry prepared in step (b), using an additional coagulation tank.

5. The method for preparing a high molecular weight latex resin powder according to claim 1, after the step (c), further comprising: the step of re-stabilizing the slurry stabilized in step (c), using an additional stabilization tank.

6. The method for preparing a high molecular weight latex resin powder according to claim 1, wherein the residence time of step (c) is 3 to 10 times longer than the residence time of step (b).

7. The method for preparing a high molecular weight latex resin powder according to claim 1, after the step (e), further comprising: the step of re-aging the slurry aged in step (e), using an additional aging tank.

* * * * *